Nov. 30, 1937.  E. J. BIEVER  2,100,374
FILTERING ASSEMBLY FOR RESPIRATORS
Filed March 11, 1936  2 Sheets—Sheet 1
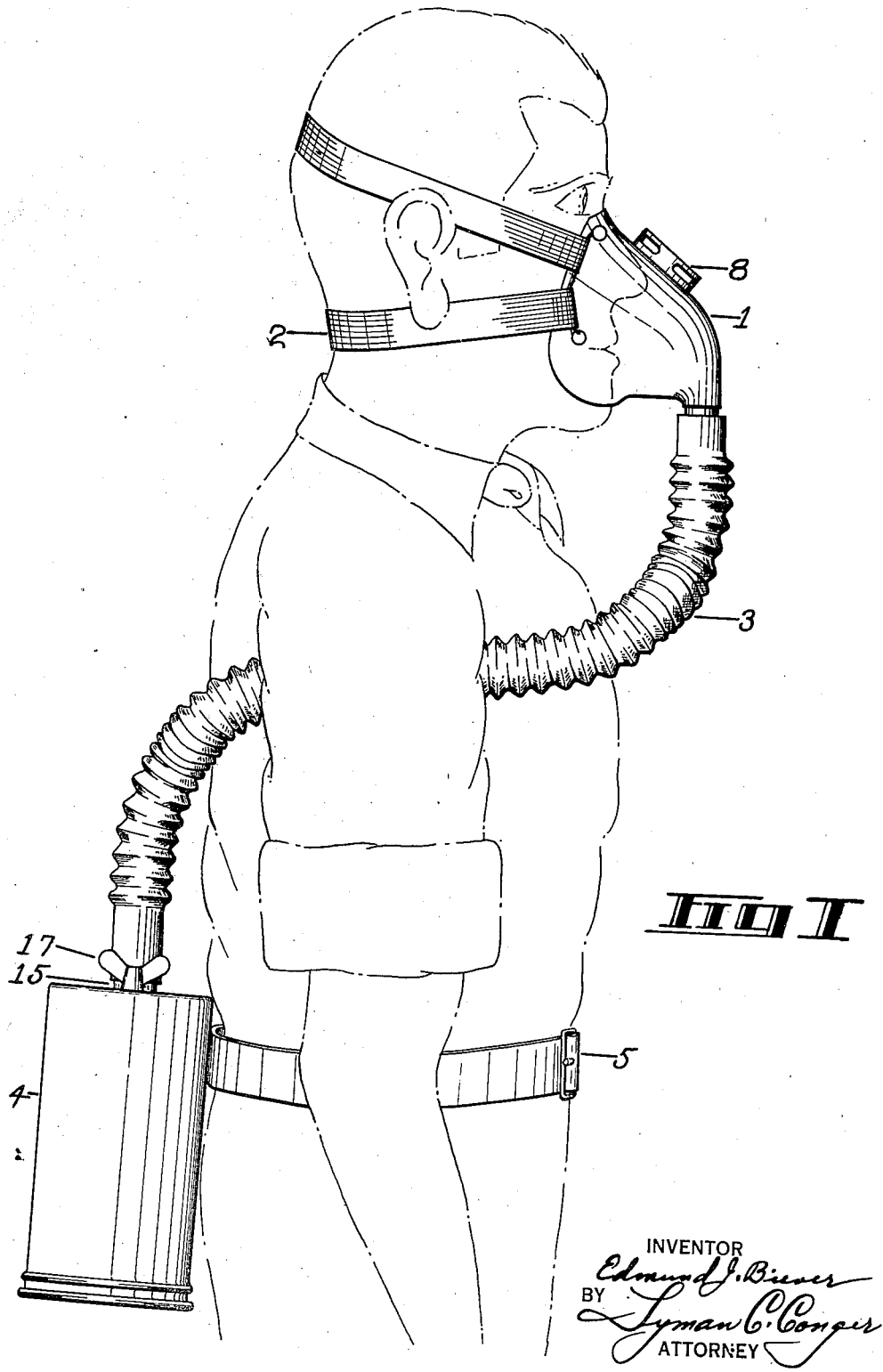
FIG. I
INVENTOR
Edmund J. Biever
BY
Lyman C. Conger
ATTORNEY Nov. 30, 1937.  E. J. BIEVER  2,100,374
FILTERING ASSEMBLY FOR RESPIRATORS
Filed March 11, 1936   2 Sheets-Sheet 2
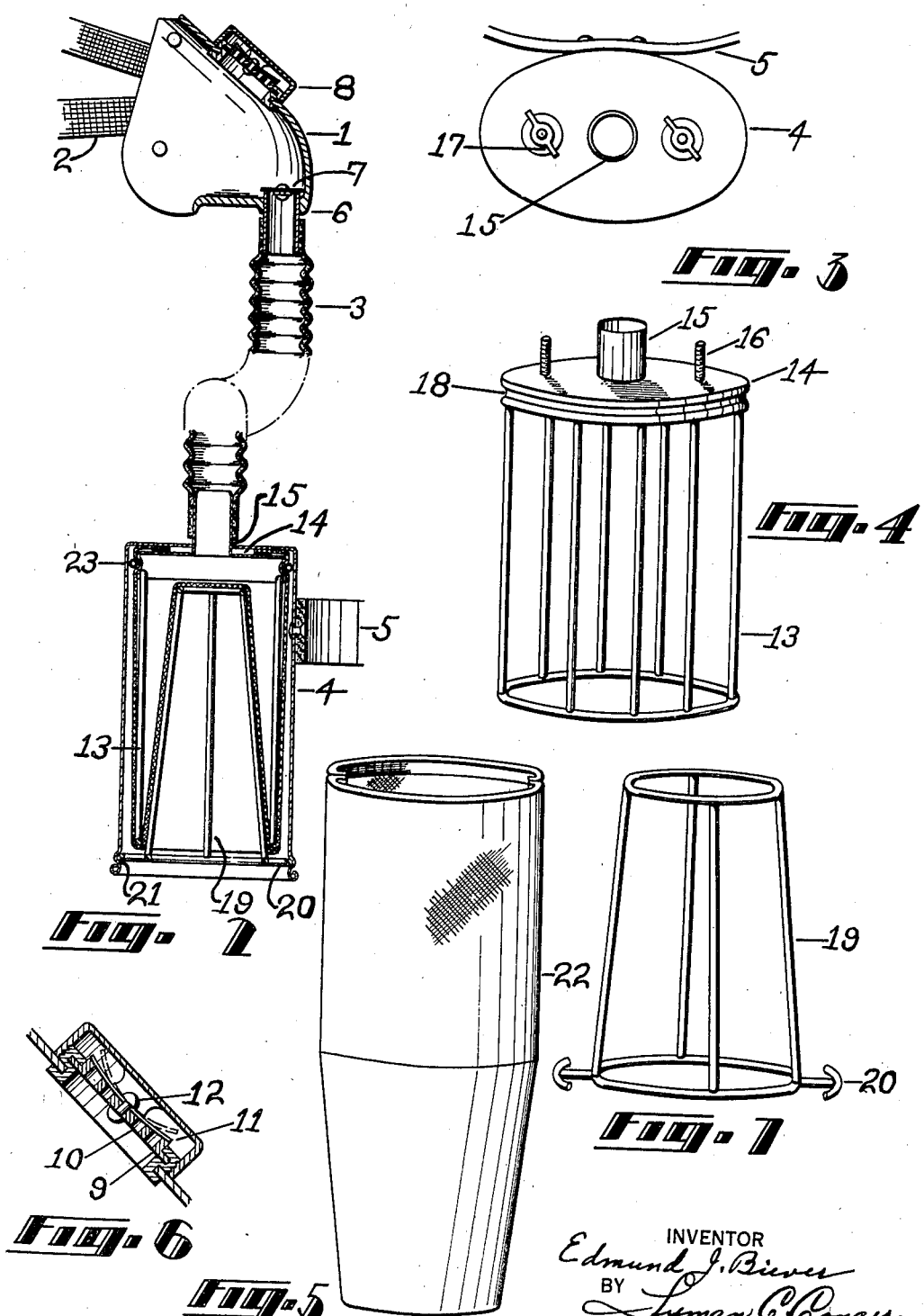
INVENTOR
Edmund J. Biever
BY Lyman C. Conger
ATTORNEY Patented Nov. 30, 1937

2,100,374

UNITED STATES PATENT OFFICE 2,100,374

FILTERING ASSEMBLY FOR RESPIRATORS

Edmund J. Biever, Kohler, Wis.

Application March 11, 1936, Serial No. 68,203

2 Claims. (Cl. 183—71)

My invention relates to improvements in filtering assembly for respirators of a type adapted to protect the wearer thereof from the inhalation of harmful or noxious dusts.

Modern medical authorities are of a practically unanimous opinion that the particles of dust, particularly silica or silica bearing dust, which are harmful to the lungs, are those which do not exceed ten microns in diameter, and some authorities hold that particles exceeding two or three microns in diameter are harmless or nearly so. Particles of this size are invisible to the unaided eye and can be detected only with the aid of a microscope.

Since the harmful particles are microscopic in size, it follows that it cannot be assumed, as hitherto, that because a respirator filters out all of the visible dust particles it efficiently protects the wearer. It also follows that the respirator must offer little resistance to the passage of air therethrough since, if the respirator offers appreciable resistance to the passage of air therethrough, it not only detracts from the efficiency of the wearer, particularly if engaged in a strenuous occupation for extended periods of time, but inhalation by the wearer will cause air to be drawn between the respirator and the face of the wearer instead of through the respirator, even though the respirator fits as tightly as practicable, and this unfiltered air may entrain harmful quantities of microscopic dust.

The objects of my invention are to obviate the aforementioned and other difficulties by, first, providing a filtering assembly for a respirator which will efficiently prevent the passage even of microscopic dust; second, to provide a filtering assembly for a respirator having a large area of filtering surface whereby the filtering medium may be made of material, such as felt, which is sufficiently thick and fibrous to efficiently filter out even microscopic dusts yet which, due to the large filtering surface, does not offer appreciable resistance to the passage of air therethrough and is not readily clogged by the adherence of filtered dust thereto; third, to provide a filtering assembly for a respirator so arranged that it may be readily cleaned or renovated; fourth, to provide a filtering assembly for a respirator so arranged that a large degree of cleaning or renovating takes place without special attention of the wearer; and, fifth, to provide a filtering assembly for a respirator having an arrangement of parts such that the air is drawn therein in a direction opposite to that of the movement of the dust suspended in the atmosphere, hence contains a minimum quantity of entrained dust.

I attain these objects by the mechanism illustrated in the accompanying drawings, in which Figure 1 is a side view of the respirator attached to the person of a wearer; Fig. 2, a side view thereof, partly in section; Fig. 3, a top view of the canister or filtering assembly; Fig. 4, a perspective view of the frame forming part of the filtering assembly; Fig. 5, a perspective view of the filtering element; Fig. 6, a sectional view of a preferred form of check valve mechanism; and Fig. 7, a perspective view of another frame forming a part of the filtering assembly.

Similar numerals refer to similar parts throughout the several views.

The respirator comprises a face piece 1 adapted to fit over the nose and mouth of the wearer and provided with elastic bands 2 or other suitable means for supporting the same in position. A hose or conduit 3 provides communication between the face piece 1 and the canister 4 of the filtering assembly. The canister 4 is provided with suitable means, such as the belt 5, for attaching the same to the person of the wearer.

The face piece 1 is attached to the hose 3 by means of the nipple 6 attached to the face piece and provided with an inlet valve 7. The face piece 1 is also provided with an exhaust valve 8. Valves 7 and 8 act as check valves and are the same in principle of operation, although they may differ somewhat in details of construction.

A suitable form of valve for this purpose is shown in section in Figure 6. This valve comprises a base 9 provided with a plurality of apertures 10 adapted to permit the passage of air therethrough. A flexible diaphragm 11 of rubber or other suitable material is mounted on the base 9 and secured thereto at the mid-portion of said diaphragm as by the rivet 12. Either pressure from beneath or partial vacuum above the diaphragm causes it to bend upwardly around its circumference as shown by the dotted lines in Figure 6, thus exposing the apertures 10 and allowing air to pass therethrough. Vacuum from beneath or pressure above the diaphragm causes it to seat on the base 9 and close the apertures 10, as shown by the full lines in Fig. 6. The valve thus acts as a check valve, permitting the passage of air in one direction only. It will be noted that the base 9 is somewhat concave on its upper surface for the purpose of facilitating the functioning of the diaphragm 11.

The canister 4 is adapted to receive a rack or frame 13 which has a loose fit therein so as to leave a considerable space between the walls of the canister and the frame as shown in Fig. 2, and provides an unrestricted air passageway between the rack and the canister. The rack 13 is provided with a solid or air impervious top portion 14 through which the nipple 15 extends to provide communication between the interior of the rack and the hose 3 and to provide a means for attaching the latter. The top portion 14 is also provided with a plurality of bolts 16 adapted to extend through the top of the canister 4 and for engagement with wing nuts 17 or other means for securing the rack 13 in position in the canister. The top portion 14 is provided with a circumferential groove 18 for a purpose hereinafter described.

A second rack or frame 19 is adapted to fit within the rack 13, being spaced therefrom to leave an air passageway therebetween, as shown in Fig. 2. The rack 19 is provided with clips 20 adapted to engage an annular groove 21 in the canister 4 and thus holds the rack 19 in place by frictional engagement.

It will be understood that the racks 13 and 19 may be formed in a variety of different shapes, as described, or may be made of various materials; for example, wire, as illustrated, screen or other air pervious material, the purpose of these racks being to hold the hereinafter described filtering element in the desired position and to provide an air space in the interior of said element without preventing the passage of air therethrough.

The filtering element 22 is preferably substantially cylindrical in shape, open at one extremity and closed at the other extremity and tapering from a point near the midline of the element to a smaller diameter at the closed extremity than at the open extremity.

To place the filtering element 22 in operative position the open end thereof is drawn over the rack 13 and lapped over onto the top of the top portion 14. The lapped-over portion is clamped between the top of the canister and the top of the rack, as shown in Fig. 2, by the action of the wing nuts 17. As a further means of securing the filtering element in position and to prevent leakage of air between it and the rack, a spring 23 encircles the filtering element and forces it into the groove 18 as shown in Fig. 2.

The rack 19, when placed in position, forces the tapered portion of the filtering element upward and within the canister as shown in Fig. 2. Thus the filtering element is folded back upon itself at acute angles and, as shown in Fig. 2, is caused to assume a zigzag formation. It will be noted that the racks 13 and 19 are positioned on opposite sides of the filtering element 22, the former on the interior and the latter on the exterior thereof.

The zigzag position of the filtering element 22 gives it a much larger area of filtering surface than would otherwise be the case. Because of the large area of filtering surface, but little resistance is offered to the passage of the air and the normal breathing of the wearer is not interfered with. The large filtering surface also prevents clogging, since a considerable area of the filter must be clogged before its efficiency is impaired or before resistance is offered to the flow of air therethrough. Due to the little resistance offered and the large filtering surface obtained, the filtering element 22 may be made of felt or other tightly woven cloth which will filter out even the finest of dust without unduly increasing the resistance offered to the breathing of the wearer.

A further advantage of the large filtering surface is that the velocity of the air passing through any portion thereof is relatively low. Respirators of limited filtering area offer considerable resistance to the passage of air therethrough, not only interfering with the normal breathing of the wearer but resulting in the air being drawn through the filter at high velocity, thus creating a tendency for entrained dust particles to be drawn through or around the filter. The low velocity of air circulation in my improved respirator obviates this tendency and thus increases the efficiency of the filter.

Respirators offering considerable resistance to the passage of the air or having small filtering areas which readily become clogged with dust and offer such resistance are inefficient, as the high resistance causes unfiltered air to be drawn between the respirator and the face of the wearer and through any other space or interstice. This tendency is obviated in my improved respirator, since the resistance to the passage of air through the filter is less than through the interstices above mentioned.

The filtering element may be readily cleaned and renovated by removing the hose 3 and blowing compressed air through the nipple 15. Furthermore, a considerable degree of cleaning takes place automatically, since the movements of the wearer jar the canister somewhat and dislodge dirt particles, etc. from the filtering element 22, allowing them to drop through the open bottom of the canister to the floor. Thus the disadvantage of having to constantly renew filters is obviated and at the same time it is assured that efficient filtering is maintained at all times.

I do not limit myself to the exact form of canister shown, that is, with an open or unenclosed bottom, since other forms, for example, closed at the bottom and provided with louvers in the side walls, may be used.

However, a form similar to that disclosed is advantageous since it aids the efficiency of the filter. Since dust, even of the type which will remain suspended in the air for some time, is heavier than air, the normal movement of the dust particles in the air is downward, a movement which, of course, takes place under the influence of gravity, more or less rapidly according to the size and weight of the dust particles. The tendency, therefore, is for the dust particles to pass the canister, since to enter it they must be drawn upward against the direction of their normal movement and against the force of gravity. Obviously, a stronger current of air or suction is necessary to accomplish this result than would be required to deflect the dust laterally, hence a considerable portion of the dust, particularly the heavier particles, is not drawn into the canister 4, diminishing the amount of dust which must be removed by the filter, and the tendency to become clogged by the accumulation of dust. It is desirable, therefore, that the shape of the canister be such that the air is drawn thereinto in a direction opposite to that of the direction of the normal movement of dust in the atmosphere.

When the device is affixed to the person of the wearer, as shown in Fig. 1, inhalation causes valve 8 to close, preventing unfiltered air from being drawn therethrough into the face piece, and valve 7 to open, causing air to be drawn into the face piece 1 through canister 4, filtering element 22, nipple 15, hose 3, and valve 7. Exhalation causes the valve 7 to close and the valve 8 to open, discharging the exhaled air into the exterior atmosphere. The closing of valve 7 keeps the exhaled air from being forced back into the hose 3 or canister 4 so that it is not rebreathed by the wearer.

The face piece 1, due to the fact that it is not necessary to incorporate any filtering material therein, may be relatively small and does not interfere with the vision of the wearer, and the entire arrangement of parts is such as to interfere very little with the normal movements or operations of the wearer.

It will be evident to those skilled in the art that variations in the form and arrangement illustrated and described may be made without departing from the spirit of the invention, and I therefore do not limit myself to the exact construction and arrangement illustrated and described, but claim all modifications thereof within the spirit of my invention and the scope of the appended claims.

I claim:

1. In a respirator, the combination of a canister unenclosed on the side normally bottommost; an air pervious rack having a solid top portion; means for attaching said top portion to said canister, said rack being spaced from said canister to leave an air space therebetween throughout a substantial portion of its surface area; a nipple attached to said top portion and extending through said canister whereby to provide communication between the interior of said rack and the exterior of said canister; a filtering element of dust impervious material enclosing said rack supported thereby and overlapping said solid top portion and being clamped between said top portion and said canister when said frame is attached to said canister as aforesaid; a second rack adapted to fit within said first mentioned rack and to engage said filtering element and fold it back upon itself in acute angles and means for securing and positioning said second mentioned rack in said canister.

2. In a respirator, the combination of a canister unenclosed on the side normally bottommost, an air-pervious rack having a solid top portion, means for attaching said top portion to said canister, said rack being spaced from said canister to leave an air space therebetween throughout a substantial portion of its surface area, means for providing communication between the interior of the rack and the exterior of the canister, a filtering element of dust impervious material enclosing said rack supported thereby and overlapping said solid top portion and being clamped between said top portion and said canister when said frame is attached to said canister as aforesaid, a second rack adapted to fit within said first mentioned rack and to engage said filtering element and fold it back upon itself in acute angles, and means for securing and positioning said second mentioned rack in said canister.

EDMUND J. BIEVER.